(12) United States Patent
Sommer et al.

(10) Patent No.: US 11,107,309 B2
(45) Date of Patent: Aug. 31, 2021

(54) METHOD FOR PROVIDING SECURITY FOR A TRANSFER POINT

(71) Applicants: Martin Sommer, Aachen (DE); Tobias Augspurger, Aachen (DE); Marco Bellof, Aachen (DE)

(72) Inventors: Martin Sommer, Aachen (DE); Tobias Augspurger, Aachen (DE); Marco Bellof, Aachen (DE)

(73) Assignee: StreetScooter GmbH, Aachen (DE)

( * ) Notice: Subject to any disclaimer, the term of this patent is extended or adjusted under 35 U.S.C. 154(b) by 0 days.

(21) Appl. No.: 15/695,148

(22) Filed: Sep. 5, 2017

(65) Prior Publication Data

US 2018/0075680 A1 Mar. 15, 2018

(30) Foreign Application Priority Data

Sep. 15, 2016 (DE) ...................... 10 2016 117 387.8

(51) Int. Cl.
*E05B 65/00* (2006.01)
*B60Q 1/00* (2006.01)
(Continued)

(52) U.S. Cl.
CPC ......... *G07C 9/00571* (2013.01); *B60N 2/002* (2013.01); *B60R 25/102* (2013.01);
(Continued)

(58) Field of Classification Search
CPC .............. E05G 5/003; G06K 9/00221; G06K 9/00825; G06K 9/00778; G06Q 10/0832; G06Q 50/163; G07C 9/00174; G07C 2009/00285; G07C 2009/00293; G07C 2009/00301; G07C 11/00; G07C 9/00087; G07C 9/00103; G07C 9/00571; G07C 9/00896; G07C 9/00912; G07C 9/00563;
(Continued)

(56) References Cited

U.S. PATENT DOCUMENTS 4,112,419 A * 9/1978 Kinoshita ............. B66B 1/3476
187/392
5,992,094 A 11/1999 Diaz
(Continued)

FOREIGN PATENT DOCUMENTS

CN 101046910 A 10/2007
CN 101449142 A 6/2009
(Continued)

*Primary Examiner* — Dionne Pendleton
(74) *Attorney, Agent, or Firm* — Reinhart Boerner Van Deuren P.C.

(57) ABSTRACT

The disclosure relates particularly to a method for providing security for a transfer point for at least one receiving apparatus, performed by one or more apparatuses, the method comprising: receiving state information at least characteristic for the presence of at least one person and/or at least one object at the transfer point; checking whether the state information meets a security requirement; and outputting or causing outputting of an activation signal only if the state information meets the security requirement. Further, the disclosure relates to a vehicle for use as a transfer apparatus for at least one transfer point, to a transfer point and to a system and a computer program.

19 Claims, 5 Drawing Sheets

(51) Int. Cl.

| | | |
|---|---|---|
| *G07C 9/00* | (2020.01) | |
| *G07C 11/00* | (2006.01) | |
| *G07C 5/00* | (2006.01) | |
| *B60R 25/31* | (2013.01) | |
| *B60R 25/30* | (2013.01) | |
| *B60R 25/102* | (2013.01) | |
| *B60N 2/00* | (2006.01) | |
| *G08B 21/22* | (2006.01) | |
| *G01S 15/04* | (2006.01) | |
| *G01S 17/04* | (2020.01) | |
| *H04W 4/35* | (2018.01) | |
| *H04W 4/38* | (2018.01) | |
| *H01Q 1/32* | (2006.01) | |
| *E05G 5/00* | (2006.01) | |
| *G06K 9/00* | (2006.01) | |
| *G06Q 10/08* | (2012.01) | |

(52) U.S. Cl.
CPC .............. *B60R 25/30* (2013.01); *B60R 25/31* (2013.01); *E05G 5/003* (2013.01); *G01S 15/04* (2013.01); *G01S 17/04* (2020.01); *G06K 9/00221* (2013.01); *G06Q 10/0832* (2013.01); *G07C 5/008* (2013.01); *G07C 9/00896* (2013.01); *G07C 9/00912* (2013.01); *G07C 11/00* (2013.01); *G08B 21/22* (2013.01); *H01Q 1/3291* (2013.01); *H04W 4/35* (2018.02); *H04W 4/38* (2018.02)

(58) Field of Classification Search
CPC . G07C 9/23; G07C 9/257; G07C 9/26; G07C 9/27; G07C 9/37; G07C 2209/64; G07C 9/00944; G07C 9/10; G07C 9/20; G07C 9/25; G07C 9/28; G07C 9/29; G07C 9/30; G07C 9/00; G07C 9/15; B66B 1/468; B66B 2201/4676; B66B 2201/4615; B66B 1/2408; B66B 1/28; B66B 1/3461; B66B 1/3492; B66B 1/48; B66B 2201/223; B66B 2201/463; B66B 2201/4653; B66B 2201/4661; B66B 25/00; B66B 5/0018; B66B 5/0087; B66B 5/02; B66B 9/00; B66B 1/32; B66B 5/0093; B66B 5/044; B66B 5/18; B66B 5/24; B66B 1/3476; A47B 95/02; A47K 5/1202; A61B 1/00066; A61L 2202/14; A61L 2/0088; A61L 2/18; A61L 2/22; B05B 11/3052; B05B 11/3057; B60Q 3/30; B64D 11/02; B64F 5/30; B65G 69/001; B65G 69/003; B65G 69/2805; B65G 69/2882; E05B 17/10; E05B 1/0069; E05B 79/20; E05B 81/54; E05B 81/77; E05B 83/26; E05B 85/12; G05D 1/0225; G08B 13/08; G08B 13/19; G08B 21/22; G08B 21/245; G08B 25/008; G08B 29/04; G08B 29/12; G08B 29/183; G08B 13/196; H04L 67/12; H04L 69/28; H04M 1/72569; H04M 1/72572; H04M 1/72577; H04W 4/027; H04W 4/029; H04W 4/40; H04W 52/0254; H04W 8/02; H04W 4/025; H04W 64/006; H04W 76/28; Y02D 70/1224; Y02D 70/142; Y02D 70/144; Y02D 70/146; Y02D 70/164; Y02D 70/166; Y02D 70/22; Y02D 70/23; Y02D 70/26; Y02D 70/00; Y02D 70/122; Y02D 70/1262; Y02D 70/162; Y10S 292/43; Y10S 292/65; H04N 7/181; H04N 7/185; G01V 8/20; G01V 9/00; G06T 7/20; G06T 7/593
See application file for complete search history.

(56) References Cited

U.S. PATENT DOCUMENTS

| | | | | |
|---|---|---|---|---|
| 10,134,278 | B1* | 11/2018 | Konrardy | G08G 1/096791 |
| 10,275,670 | B1* | 4/2019 | Li | B60R 25/305 |
| 10,360,744 | B1* | 7/2019 | Kerzner | G06Q 50/163 |
| 10,527,428 | B1* | 1/2020 | Mehta | G06Q 10/047 |
| 2005/0138385 | A1* | 6/2005 | Friedli | B66B 1/468 |
| | | | | 713/182 |
| 2005/0249382 | A1* | 11/2005 | Schwab | G07C 9/00 |
| | | | | 382/115 |
| 2005/0269404 | A1 | 12/2005 | Landwirth et al. | |
| 2008/0157940 | A1* | 7/2008 | Breed | B60N 2/853 |
| | | | | 340/425.5 |
| 2010/0052947 | A1* | 3/2010 | Lin | G07C 9/00174 |
| | | | | 340/932.2 |
| 2011/0022252 | A1* | 1/2011 | Dueck | B61B 1/00 |
| | | | | 701/19 |
| 2014/0350924 | A1* | 11/2014 | Zurek | G10L 15/20 |
| | | | | 704/231 |
| 2015/0344265 | A1* | 12/2015 | Hakonen | H04B 17/318 |
| | | | | 187/392 |
| 2018/0044132 | A1* | 2/2018 | Fauconnet | B66B 1/28 |
| 2018/0265333 | A1* | 9/2018 | Schuster | B66B 13/14 |
| 2021/0082219 | A1* | 3/2021 | Kane | G07C 9/00896 |
| 2021/0082271 | A1* | 3/2021 | Mars | H04L 9/3234 |

FOREIGN PATENT DOCUMENTS

| | | |
|---|---|---|
| CN | 105593842 A | 5/2016 |
| DE | 200 01 122 U1 | 9/2000 |
| WO | WO 01/30213 A2 | 5/2001 |
| WO | WO 01/39638 A1 | 6/2001 |
| WO | WO 2012/034171 A1 | 3/2012 |
| WO | WO 2015/100390 A1 | 7/2015 |

* cited by examiner

METHOD FOR PROVIDING SECURITY FOR A TRANSFER POINT

CROSS-REFERENCE TO RELATED PATENT APPLICATION

This patent application claims priority to German Application No. 10 2016 117 387.8, filed Sep. 15, 2016, the entire teachings and disclosure of which are incorporated herein by reference thereto.

FIELD

Exemplary embodiments of the invention relate to the provision of security for a transfer point for receiving apparatuses, particularly transfer points for parcel stations or parcel boxes.

BACKGROUND

Receiving apparatuses, such as e.g. safety deposit boxes or goods delivery containers, particularly parcel stations (such as Deutsche Post's packing station, for example) or parcel boxes, are used for receiving and keeping objects. Parcel stations or parcel boxes allow, by way of example, a novel form of delivery/collection of shipments and/or deliveries such as parcels, packets and/or letters for persons wishing to receive or send shipments and/or deliveries at or close to their abode even when absent. To this end, by way of example parcel boxes are usually installed in front of the abode of the parcel box user—in a similar manner to a mailbox, but with a larger holding volume—and parcels are then delivered or collected by the delivery agent by placing them into the parcel box or by removing them from the parcel box.

Parcel stations can have at least one, but preferably a plurality of, receiving apparatus(es), wherein users at parcel stations can receive and send particularly parcels, packets and/or letters. Parcel stations may be public and be situated, by way of example, in public places or at delivery stations. It is also possible for parcel stations to be made available, by way of example, to the occupants of residential complexes or multiple dwellings, the parcel stations not being readily accessible to the public and being situated, by way of example, in the entrance area or cellar of such residential complexes or multiple dwellings.

To load the receiving apparatuses or to collect the shipments and/or deliveries from the receiving apparatuses for shipping, the delivery company uses transfer apparatuses that can perform a transfer from and to the receiving apparatuses. A transfer apparatus is, by way of example, a vehicle that is configured to receive, transport and deliver applicable shipments and/or deliveries. By way of example, the transfer apparatuses used are vehicles that drive to the locations of transfer points and, particularly in automated fashion, transfer shipments and/or deliveries to the receiving apparatuses.

To further optimize the transfer of shipments and/or deliveries to the receiving apparatuses and from the receiving apparatuses, transfer points are provided, in particular, at which an automated transfer can take place, for example. Since the receiving apparatuses are usually also accessible to the public, however, for example so that the users of parcel boxes can collect or deliver parcels, problems arise with regard to the security of a transfer particularly in the case of an automated transfer. Firstly, a risk of injury to persons present should be minimized during a transfer. Secondly, the shipments and/or deliveries also need to be protected against unauthorized access.

SUMMARY OF SOME EXEMPLARY EMBODIMENTS OF THE INVENTION

The present invention is therefore based, inter alia, on the object of overcoming these problems. In particular, the aim is to be able to provide a transfer point that takes into consideration security requirements for persons and shipments and/or deliveries in the event of an automated transfer of shipments and/or deliveries to receiving apparatuses, for example of parcels to parcel boxes.

In accordance with a first exemplary aspect of the invention, a method for providing security for a transfer point for at least one receiving apparatus is disclosed, wherein the method is performed by one or more apparatuses, the method comprising:
  receiving state information at least characteristic for the presence of at least one person and/or at least one object at the transfer point;
  checking whether the state information meets a security requirement; and
  outputting or causing outputting of an activation signal only if the state information meets the security requirement.

In accordance with the first exemplary aspect of the invention, an apparatus is further disclosed (and subsequently referred to as apparatus according to the first aspect of the invention) configured or comprising respective means for performing and/or controlling a method in accordance with the first aspect of the invention. In this case, either all steps of the respective method can be controlled, or all steps of the respective method can be performed, or one or more steps can be controlled and one or more steps can be performed. One or more of the means can also be implemented and/or controlled by the same unit. By way of example, one or more of the means may be formed by one or more processors.

For the method in accordance with the first aspect of the invention, an apparatus is furthermore disclosed (and subsequently referred to as apparatus in accordance with the first aspect of the invention) that comprises at least one processor and at least one memory that contains program code, wherein the memory and the program code are configured to, with the at least one processor, cause an apparatus (for example the apparatus having the processor and the memory) to perform and/or control at least the respective method. In this case, either all steps of the respective method can be controlled, or all steps of the respective method can be performed, or one or more steps can be controlled and one or more steps can be performed.

For example, an exemplary apparatus in accordance with the first aspect of the invention further comprises means for storing information such as a program memory and/or a main memory. For example, an exemplary apparatus in accordance with the first aspect of the invention further comprises respective means for receiving and/or sending information via a network, such as a network interface. For example, apparatuses in accordance with the first aspect of the invention are connected and/or connectable to one another via one or more networks.

The apparatus in accordance with the first aspect of the invention may in this case comprise an electronic device, for example a control apparatus. The apparatus in accordance with the first aspect of the invention may particularly be embodied as a portable device or permanently installed in a further apparatus, for example a transfer point, a receiving apparatus or a transfer apparatus. An exemplary apparatus in accordance with the first aspect of the invention is or comprises, for example, a data processing installation that is configured in terms of software and/or in terms of hardware to be able to perform the respective steps of an exemplary method in accordance with the first aspect of the invention. Examples of a data processing installation are a computer, a desktop computer, a server, a Thinclient and/or a portable computer (mobile device), such as a laptop computer, a tablet computer, a wearable, a personal digital assistant or a smartphone, for example. The apparatus in accordance with the first aspect of the invention particularly comprises a server that outputs the activation signal or causes outputting thereof, wherein the activation signal is then transferred to a further apparatus (for example to a transfer point, a receiving apparatus and/or a transfer apparatus). The server may be integrated, by way of example, in the control center, particularly a backend of a delivery company that is responsible for the transfer to the receiving apparatuses.

For the method in accordance with the first aspect of the invention, a computer program is furthermore disclosed (and subsequently referred to as computer program in accordance with the first aspect of the invention) that comprises program instructions causing a processor to perform and/or control the method in accordance with the first aspect of the invention when the computer program runs on the processor. In this specification, a processor is intended to be understood to mean, inter alia, control units, microprocessors, microcontrol units such as microcontrollers, digital signal processors (DSPs), application-specific integrated circuits (ASICs) or field programmable gate arrays (FPGAs). In this case, either all steps of the respective method can be controlled, or all steps of the method can be performed, or one or more steps can be controlled and one or more steps can be performed. The computer program may be distributable, by way of example, via a network such as the Internet, a telephone or mobile radio network and/or a local area network. The computer program may be at least partly software and/or firmware of a processor. It may equally be implemented at least partly as hardware.

In accordance with the first aspect of the invention, a computer-readable storage medium is also described that contains a computer program in accordance with the first aspect of the invention. A computer-readable storage medium may e.g. be in the form of a magnetic, electrical, electromagnetic, optical and/or other kind of storage medium. A computer-readable storage medium of this kind is preferably concrete (that is to say "tangible"), for example it is in the form of a data carrier apparatus. Such a data carrier apparatus is, by way of example, portable or permanently installed in an apparatus. Examples of such a data carrier apparatus are volatile or nonvolatile random access memories (RAMs) such as e.g. NOR flash memories or sequential access memories such as NAND flash memories and/or read only memories (ROMs) or read/write memories. Computer-readable is intended to be understood, for example, to mean that the storage medium can be read and/or written to by a computer or a data processing installation, for example by a processor. The storage medium may, by way of example, be part of a processor, for example a (nonvolatile or volatile) program memory of the processor or a portion thereof. The storage medium is, by way of example, concrete, that is to say palpable, and/or nontransitory.

In accordance with a second exemplary aspect of the invention, a vehicle for use as a transfer apparatus for at least one transfer point is disclosed, wherein the vehicle is configured to communicate with an apparatus in accordance with the first aspect of the invention. The vehicle in accordance with the second aspect of the invention may alternatively or cumulatively comprise an apparatus in accordance with the first aspect of the invention. In particular, the vehicle has a sensor device that is configured to determine or ascertain state information characteristic for the presence of persons or objects at a transfer point.

In accordance with a third exemplary aspect of the invention, a transfer point for at least one receiving apparatus is disclosed, wherein the transfer point is configured to communicate with an apparatus in accordance with the first aspect of the invention. The transfer point in accordance with the third aspect of the invention may alternatively or cumulatively comprise an apparatus in accordance with the first aspect of the invention. In particular, the transfer point in accordance with the third aspect of the invention is configured to communicate with a vehicle in accordance with the second aspect of the invention. In particular, the transfer point in accordance with the third aspect of the invention is configured to use a vehicle in accordance with the second aspect of the invention to perform a method in accordance with the first aspect of the invention. In particular, the transfer point has a sensor device that is configured to determine or ascertain state information characteristic for the presence of at least one person and/or at least one object at a transfer point.

Further, a system is disclosed that comprises at least one apparatus in accordance with the first aspect of the invention. The system particularly further comprises a vehicle in accordance with the second aspect of the invention and/or a transfer point in accordance with the third aspect of the invention.

Exemplary embodiments of all aspects of the present invention have individual, multiple or all properties described below.

Receiving apparatuses are understood to mean, by way of example, safety deposit boxes, safety deposit box installations, lockers, refrigerators, goods delivery containers, mailboxes, parcel boxes and parcel stations that can particularly each be sealed by one or more doors and/or are secured by locking means. The receiving apparatuses are particularly configured to receive and keep shipments and/or deliveries such as letters, packets, parcels, food deliveries or beverage deliveries. A parcel box can particularly have at least one receiving compartment for parcels or packets. Further, a parcel box may, by way of example, be provided with a mail slot and possibly with a receiving compartment for letters.

A transfer point is particularly understood to mean a physically delimited point for transferring shipments and/or deliveries to at least one receiving apparatus and/or for transferring shipments and/or deliveries from at least one receiving apparatus. By way of example, the transfer point is at least one room via which at least one receiving apparatus is accessible and that is in particular protected against external influences, for example against weather influences. Similarly, the transfer point can provide protection against unauthorized access by persons or animals. A transfer point has, for example at least partly or completely, a canopy and/or may be completely or partly surrounded by walls. In particular, the transfer point is configured to grant a transfer apparatus such as a vehicle access to at least one receiving apparatus so that the transfer apparatus can perform a transfer. In particular, the transfer point is dimensioned such that a transfer apparatus such as a vehicle can enter the transfer point completely. For a transfer of shipments and/or deliveries, transfer means, for example, are provided, for example a robot arm, a conveyor belt or an elevator, by means of which an automated transfer can be effected. Such transfer means may, by way of example, be arranged in immobile fashion at the transfer point and/or may form a part of a transfer apparatus such as a vehicle.

In one exemplary embodiment, the transfer point is public, i.e. the transfer point is freely accessible to persons. By way of example, the transfer point comprises a room in which at least one receiving apparatus is provided and/or to which at least one receiving apparatus is arranged directly adjacent. In particular, users of the receiving apparatuses can gain access to the receiving apparatuses at the transfer point. By way of example, the transfer point is a publically accessible anteroom for a parcel station, mailboxes and/or for parcel boxes, wherein users remove or deliver shipments and/or deliveries such as parcels, for example, at the transfer point.

Alternatively, the transfer point may be nonpublic and, by way of example, be freely accessible only to a determined group of persons (for example the users of a multiple dwelling parcel box installation). By way of example, an access control apparatus is provided at the transfer point that is intended to grant access to the transfer point only to certain persons on the basis of predetermined criteria. This can involve, by way of example, a user check that is intended to grant access to the receiving apparatus or the receiving apparatuses only to registered users and particularly employees such as maintenance personnel.

In a further configuration, the transfer point is nonpublic and has, by way of example, an access control apparatus that grants access to the receiving apparatus(es) only to employees such as maintenance personnel. In this case, there is no provision for users to be at the transfer point. By way of example, an anteroom is provided for users at the receiving apparatus(es), while a nonpublic transfer point is arranged on another side of the receiving apparatus(es). The transfer point is then used merely for transfer by a transfer apparatus, for example for a vehicle to access the receiving apparatus (es) and particularly for entry of a vehicle.

Transfer points need to be appropriately secured in order to ensure a smooth execution of a transfer by means of a transfer apparatus. In order to avoid problems during the transfer, the transfer point should not be blocked to a transfer apparatus when a transfer is intended to take place. Particularly when there are a plurality of transfer points and transfer apparatuses that need to be coordinated with one another, further security measures are necessary in order to reduce delays in the execution of the transfers.

Particularly in the case of an automated transfer, there is a risk of injury to persons who are at the transfer point. Such a risk of injury may exist, by way of example, due to an entering vehicle as a transfer apparatus or due to means for transfer, for example a robot arm. The shipments and/or deliveries likewise need to be protected against unauthorized access during the transfer.

Particularly the check on the state information that is at least characteristic for the presence of at least one person or at least one object at the transfer point allows a transfer point to be secured further. The check is used to establish whether the state information meets a security requirement. The security requirement may, by way of example, be firmly predetermined or be determined by an external point, for example a backend or a transfer apparatus.

The security requirement relates, by way of example, to the presence of a determined number of persons at the transfer point. In particular, a check is performed to determine whether the number of persons at the transfer point exceeds a maximum value.

By way of example, the security requirement may be met when only one person is present at the transfer point, for example when a transfer requires the action of one person and/or there is sufficient space at the transfer point for one person and the transfer apparatus. Similarly, in one configuration, the state information may meet the security requirement only if the state information is characteristic for the presence of no persons at the transfer point, particularly when a nonpublic transfer point as described previously is involved. If, in particular, the transfer point is provided as nonaccessible to the public and also to registered users, then the presence of a single person may already be a security risk.

The security requirement can alternatively or additionally also take into consideration the presence of at least one object at the transfer point. In this case, it may, by way of example, be predetermined that only a determined maximum number of objects may be situated at the transfer point and/or that at least one determined object must be situated at the transfer point.

Further, the check on the basis of the security requirement can comprise classification of the state information. By way of example, at least one object of which the state information is characteristic is categorized on the basis of classes, for example on the basis of the size, the position at the transfer point and/or the shape of the at least one object. By way of example, it is also possible to distinguish between immobile objects and, in particular, animals. The security requirement can have different criteria, for example for each class of objects and/or persons. By way of example, a check is performed to determine whether objects above a determined size are situated at the transfer point and/or whether objects are located at points at the transfer point that block, by way of example, a transfer, entry or exit of a transfer apparatus, the use of means for transfer and/or the opening or closing of at least one access such as at least one door or at least one gate. Further, there may also be provision for determined objects to have to be situated at determined positions at the transfer point, such objects being involved in a transfer, for example.

A transfer apparatus is understood to mean particularly a vehicle that is configured for a transfer of shipments and/or deliveries from and/or to receiving apparatuses, and particularly a vehicle in accordance with the second aspect of the invention. A vehicle is understood to mean particularly a land vehicle, aircraft and/or watercraft that is configured particularly to perform a movement. In particular, the vehicle is an automobile, for example an electrically operated automobile or a drone such as an aerial drone, for example an autonomous aircraft. The vehicle is particularly an autonomous rotary wing aircraft, for example a helicopter or quadcopter. The vehicle is particularly configured to transport shipments and/or deliveries from and to receiving apparatuses. In particular, the vehicle has a sensor device having sensors that are configured to ascertain sensor values characteristic for state information. The vehicle can, by way of example, be controlled manually and may particularly be remotely controlled or have a driver compartment having means for directly controlling the vehicle. The vehicle may be partly autonomous or completely autonomous and, in particular, operate in at least partly or completely automated fashion by means of a control device.

In one exemplary configuration, the method further comprises:

determining or ascertaining the state information characteristic for the presence of at least one person and/or at least one object at the transfer point.

Alternatively or cumulatively, the state information characteristic for the presence of at least one person and/or at least one object at the transfer point can be received from a control center, for example an external backend or another external point.

Determining or ascertaining the state information can be performed particularly by a transfer apparatus and/or by the transfer point. By way of example, the transfer apparatus and/or the transfer point have a sensor device that is configured to determine sensor values representative of at least part of a piece of state information.

In one exemplary configuration, the determining or ascertaining of the state information comprises the use of at least one sensor sensitive to electromagnetic radiation. By way of example, an optical sensor is used that can ascertain an intensity of incident radiation, in particular electromagnetic radiation in the visible range and/or in the nonvisible range. In particular, the optical sensor is configured to provide an energy resolution and/or spatial resolution of the intensity information. The optical sensor can comprise an image sensor, in particular may be a digital image sensor and particularly part of a camera. Visual information can be ascertained by using particularly at least one semiconductor element, diodes, a CCD element or a CMOS element. By way of example, image evaluation methods or image recognition methods can be used to evaluate whether the ascertained visual information is characteristic for persons or objects. This can involve using a comparison with reference values, for example image information from an empty transfer point. By way of example, a calibration measurement is performed in order to ascertain or determine reference values, particularly by determining or ascertaining the state information at an empty transfer point. Reference values may be stored on a database, for example, that can be accessed by the apparatus in accordance with the first aspect of the invention or that is part of the apparatus in accordance with the first aspect of the invention.

The sensor used may likewise be sensitive to thermal radiation. By way of example, a thermal radiation that is characteristic for body temperature can be used here to easily ascertain whether there are persons and/or animals at the transfer point.

By way of example, at least one sensor used is sensitive to ultrasound. By way of example, at least one sensor used is a motion sensor. A sensor based on a Light Detection and Ranging (Lidar) method is also conceivable. In particular, time-dependent determinations of state information are possible, for example propagation time measurements particularly using a Time of Flight (TOF) camera. Distance measurements from surfaces within the transfer point can be performed in order to obtain information about persons or objects present at the transfer point. In particular, multiple sensors are used at different positions at the transfer point, so that a distance measurement can be used to obtain, by way of example, three-dimensional information about the surfaces at the transfer point. By way of example, a classification of the sensor values of a distance measurement from a sensor device to the surfaces, particularly of a piece of three-dimensional information, can be used to ascertain whether there are persons or objects situated at the transfer point. In principle, further methods of two-dimensional or three-dimensional imaging can be used.

In particular, the transfer point is configured in accordance with the provided mode of action of a sensor device to determine or ascertain the state information. By way of example, a transfer point can have a particularly homogenous appearance, for example by virtue of the use of the simplest possible shapes and uniform colors. By way of example only rectangular shapes without projections are provided for the transfer point. This means that it is possible to facilitate, by way of example automated image recognition of persons or objects at the transfer point. The transfer point can be temperature controlled, for example in order to facilitate the evaluation of sensor values sensitive to thermal radiation.

If, by way of example, a sensor device is arranged on a transfer apparatus, then walls of the transfer point may also be configured to allow the use of the sensor device from outside the transfer point. By way of example, at least one transparent element or a window is provided at at least one wall, which transparent element or window can be used by the transfer apparatus to ascertain or determine the state information, for example using an optical sensor or a camera, from a position outside the transfer point.

The determining or ascertaining of the state information can be performed, by way of example, continuously or at regular and/or irregular intervals of time, which, by way of example, are predetermined and/or ascertained by events. By way of example, continuous determination or ascertainment of the state information is used to continuously monitor the number of persons and/or objects at the transfer point, which number is output, by way of example, on a display apparatus, particularly a screen or a set of traffic lights, at the transfer point or at a back end.

Alternatively or cumulatively, the time of performance of the determining or ascertaining of the state information may also be determined on the basis of the detection of determined events. In one exemplary configuration, the performance of the determining or ascertaining of the state information is triggered by the detection of a predetermined status of a transfer apparatus or the triggering is caused thereby. If, in particular, it is detected that a transfer apparatus is situated at a determined position, for example when a transfer apparatus approaches the transfer point (e.g. within a determined distance) or has arrived at the transfer point or is waiting, it is possible for determining or ascertaining of the state information to be caused. Similarly, determining or ascertaining of the state information can be performed before the transfer apparatus enters or exits the transfer point or while the transfer apparatus is entering or exiting.

Further, by way of example, determining or ascertaining of the state information can be triggered by a backend, for example when the presence of a person at the transfer point is recorded by a backend, for example when maintenance work is imminent. It is likewise conceivable for a time of performance of the determining or ascertaining of the state information to be triggered by an activity at the transfer point, for example detected by means of a further sensor unit such as a motion sensor or the opening or closing of an access such as a door or a gate.

The state information characteristic for the presence of persons or objects at the transfer point can also be received from a control center, for example an external backend. A control center can, in particular, control and manage a plurality of receiving apparatuses, transfer points and transfer apparatuses for shipment distribution and/or delivery distribution.

In a further exemplary configuration, the state information is further characteristic for the status of at least one access to the transfer point and/or the activation signal is causal for a change of status of at least one access to the transfer point.

As access at the transfer point, at least one door is provided as access for persons and/or at least one gate (and/or double door system) is provided as access for a transfer apparatus, for example. Similarly, the at least one receiving apparatus may be provided with a door for receiving shipments and/or deliveries. Applicable accesses may have a closed, open or partly open status. By way of example, an access sensor is provided that detects a closed, open, unlocked and/or locked state or the performance of opening and/or closing. In particular, actuators are provided that can cause opening and/or closing of the accesses, the status of the access point also being characteristic for the status of an actuator, for example of a mode of operation or a fault state. Further, locking means may be provided, for example an electronically actuatable lock and/or an electronically actuatable locking unit, the status of the access also being characteristic for the status of a locking means. An access can moreover have an access control apparatus that, by way of example, comprises at least one control means that is configured to check whether access is granted. The status of an access can likewise comprise a status of an access control apparatus.

If it is found that the state information does not meet the security requirement, for example when at least one access is blocked and/or actuators are faulty, it is possible, by way of example, to provide a remedy such as the notification of a maintenance service or engineer.

The activation signal may be causal for a change of status of at least one access to the transfer point. By way of example, the activation signal is taken as a basis for causing opening and/or closing of the access.

In one exemplary configuration, the transfer point has at least one gate and/or at least one double door system as access for a transfer apparatus, wherein the method further comprises:
  causing opening and/or unlocking of the gate or double door system; or
  causing closing and/or locking of the gate or double door system; particularly on the basis of the activation signal that is causal for a change of status of the gate and/or double door system.

The gate (e.g. a roller shutter, sectional gate, sliding gate) is embodied particularly such that when the gate is open, it becomes possible to perform a transfer between a transfer apparatus, for example a vehicle, and a receiving apparatus. The gate is embodied particularly such that a transfer apparatus can enter the transfer point completely through the open gate. As already described, there may particularly be actuators and/or control means provided in order to perform opening, closing, unlocking and/or locking of the gate. The actuators can be caused to perform particularly the cited actions on the gate, for example on the basis of a signal from a backend and/or on the basis of an activation signal.

By way of example, there may be provision for a transfer and a transfer apparatus can approach the transfer point. In particular, it is possible for unlocking and/or at least partial opening of the gate to be caused. This allows the transfer apparatus, by way of example, to use a sensor unit, for example an optical sensor or a camera, arranged on the transfer apparatus, since the at least partly opened gate can provide a view into the transfer point. Further, the opening of a gate can allow the transfer apparatus to enter.

By way of example, upon and/or after the transfer apparatus exiting, when a gate is open, it is possible for determining or ascertaining of the state information to be performed. By way of example, a security requirement is indicated according to which no persons are meant to be at the transfer point. The gate is closed and/or locked on the basis of an activation signal, particularly only if there are no persons present at the transfer point. This makes it possible to avoid, by way of example, unintentionally trapping of persons at the transfer point after a transfer and/or blocking of the gate by persons.

In a further exemplary configuration, the transfer point has at least one gate as access for persons, wherein the method further comprises:
  causing opening and/or unlocking of the door; and/or
  causing closing and/or locking of the door;
particularly on the basis of the activation signal that is causal for a change of status of the door.

A door is understood to mean, by way of example, a sliding door, folding door, revolving door and/or swing door.

If, prior to the transfer apparatus entering, state information is determined or ascertained and is checked on the basis of the security requirement, then it is possible to ensure, by way of example, that there are no persons situated at the transfer point and subsequently an activation signal can be used to close and/or lock the door in order to provide security.

A display apparatus may, by way of example, be provided at the transfer point in order to display the probable duration of a transfer by a transfer apparatus or the duration of locking, for example in order to advise waiting persons of the duration of closing of the transfer point. A display apparatus may, by way of example, be provided at the transfer point in order to display the probable time of the next arrival of a transfer apparatus and hence to convey to the users of the transfer point when the transfer point will probably be closed.

Similarly, it is possible for measures to be taken, and, by way of example, for at least one door to be unlocked and opened, if the state information does not meet the security requirement, so that, by way of example, persons situated at the transfer point are given the opportunity to leave the transfer point and/or at least one door is closed and/or locked in order to prevent persons present from leaving the transfer point through the gate, for example. This is done on the basis of warning information, for example.

In one exemplary embodiment, the method further comprises:
  outputting or triggering outputting of warning information if the state information does not meet the security requirement.

The form or the content of the warning information is, in particular, characteristic for what criteria or to what extent criteria of the security requirement have not been observed.

By way of example, warning information is used to implement at least one local measure, i.e. particularly a measure recognizable at the transfer point, or at least one external measure, which comprises particularly communication with an external point, for example a backend. In particular, the method further comprises:
  causing a clearance measure for the transfer point on the basis of the warning information.

A clearance measure is understood to mean particularly measures that cause or promote clearance of the transfer point directly or indirectly. Alternatively or cumulatively, there may also be provision for the clearance measure to cause or promote the presence of particular persons or objects. Locally, it is possible, by way of example, as already stated, for at least one access such as a door or a gate to be opened and/or unlocked. This can cause persons to be able to leave the transfer point or, by way of example, a transfer apparatus to be able to enter and/or exit and/or a transfer apparatus to have to wait.

Further, an audible or visual warning can be output particularly at the transfer point or output thereof can be caused. By way of example, on the basis of an audible or visual warning, at least one person situated at the transfer point is made aware that it is necessary to leave the transfer point. Further measures are, by way of example, raising of the noise level, changing of the temperature, changing of light conditions, for example darkening of the transfer point, with the aim of using the measure to affect persons present to the effect that the persons leave the transfer point/the person leaves the transfer point.

An audible or visual warning can likewise be output externally, or output thereof can be caused, for example at a backend. Further, by way of example, a communication by an operator at the backend with the person or the persons at the transfer point is initiated. Similarly, a security service, a maintenance service, an emergency service or the police can be alerted on the basis of warning information.

In the event of one or more objects that do not meet the security requirement being present, personnel is notified in order to remove the object/objects, for example.

In particular, an order, particularly an escalating order, of measures and/or clearance measures is provided if the state information does not meet the security requirement. By way of example, first of all an audible and/or visual warning is effected at the transfer point. When the, by way of example, freshly determined or freshly ascertained state information continues not to meet the security requirement, for example because at least one person present does not leave the transfer point, a communication with an operator at the backend is subsequently initiated. Finally, the next measure can be for a security service to be alerted.

In a further exemplary embodiment, the method further comprises:
    receiving the activation signal and/or warning information by a transfer apparatus; and
    causing a change of a mode of operation of the transfer apparatus on the basis of the activation signal and/or warning information.

The mode of operation of the transfer apparatus comprises particularly performance of at least one transfer, particularly a transfer of a shipment and/or delivery, movement of the transfer apparatus, waiting of the transfer apparatus or a combination thereof.

When the activation signal and/or warning information is received by a transfer apparatus, the behavior of the transfer apparatus can be jointly determined by the state of the transfer apparatus. By way of example, a transfer or movement of the transfer apparatus on the basis of an activation signal is performed only if the state information meets the security requirement. Waiting of the transfer apparatus is performed on the basis of warning information, for example.

In a further configuration, the state information is further characteristic for the status of at least one transfer apparatus. By way of example, this makes it possible to establish whether a transfer apparatus is blocked or has broken down and particularly also to take remedial measures, for example notification of an engineer or a vehicle recovery service.

In a further configuration, the state information is further characteristic for a fault status of the transfer point. By way of example, this makes it possible to establish whether the transfer point is faulty and particularly also to take remedial measures, for example notification of an engineer. The fault status can relate, by way of example, to electronic and/or mechanical components of the transfer point.

In a further configuration, the method further comprises:
    causing or triggering causing of a transfer of at least one shipment and/or delivery between the transfer apparatus and a receiving apparatus, particularly on the basis of the activation signal.

A shipment and/or delivery is, by way of example, a letter (particularly a letter containing goods, e.g. a book), a packet or a parcel, a food delivery and/or beverage delivery, laundry and/or piece goods. A transfer is understood to mean, by way of example,
    that a shipment and/or delivery is physically situated inside or directly at a receiving apparatus and is transferred to a state in which the shipment and/or delivery is situated inside or directly at a transfer apparatus; or
    the shipment and/or delivery is physically situated inside or directly at a transfer apparatus and is transferred to a state in which the shipment and/or delivery is situated inside or directly at a receiving apparatus.

The exemplary configurations of the present invention that are described above in this description are also intended to be understood as disclosed in all combinations with one another. In particular, exemplary configurations are intended to be understood as disclosed in relation to the different aspects of the invention.

In particular, the description of method steps above or below in accordance with preferred embodiments of a method is also intended to disclose corresponding means for performing the method steps through preferred embodiments of an apparatus. Similarly, the disclosure of means of an apparatus for performing a method step is also intended to disclose the applicable method step.

Further advantageous exemplary configurations of the invention can be found in the detailed description below of some exemplary embodiments of the present invention, particularly in conjunction with the figures. However, the figures are intended to serve only the purpose of clarification, but not to determine the scope of protection of the invention. The figures are not to scale and are merely intended to reflect the general concept of the present invention by way of example. In particular, features that are contained in the figures are in no way intended to be regarded as a necessary part of the present invention.

DETAILED DESCRIPTION OF SOME EXEMPLARY EMBODIMENTS OF THE INVENTION

Figure 1:
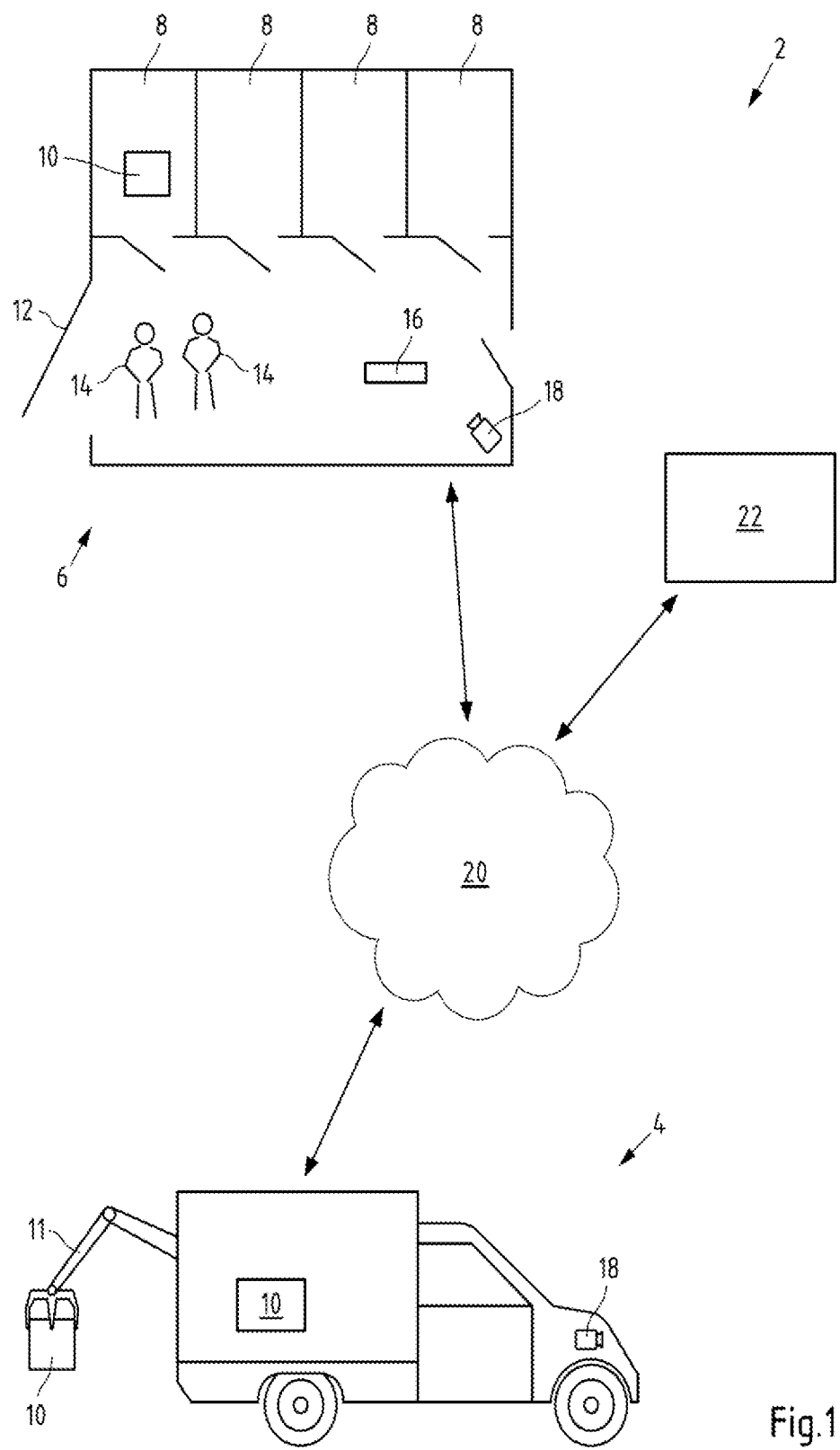
FIG. 1 shows a schematic depiction of an exemplary embodiment of a system in accordance with the present invention.

FIG. 1 shows a schematic depiction of an exemplary embodiment of a system 2 in accordance with the present invention.

The system 2 comprises a vehicle 4 for use as a transfer apparatus for at least one transfer point 6. The transfer point 6 is configured to allow the vehicle 4 access to receiving apparatuses 8, so that a transfer of shipments and/or deliveries 10 from the vehicle 4 to the receiving apparatuses 8 or from the receiving apparatuses 8 to the vehicle 4 can be performed at the transfer point 6.

A shipment and/or delivery 10 is, by way of example, a letter (particularly a letter containing goods, e.g. a book), a packet or a parcel. A receiving apparatus 8 is, by way of example, a parcel box that is used for receiving and keeping shipments and/or deliveries 10 and allows the user to receive or send shipments and/or deliveries 10 at or from his abode in the absence of the user.

For the purpose of loading the receiving apparatuses 8 and for the purpose of collecting the shipments and/or deliveries 10 from the receiving apparatuses 8, the delivery company provides the vehicle 4. In this exemplary embodiment, the vehicle 4 is a manually or autonomously controlled land vehicle that can transfer shipments and/or deliveries 10 to the receiving apparatuses particularly in automated fashion. For the purpose of automated transfer, a robot arm 11 is provided that can perform a transfer of shipments and/or deliveries 10 at the transfer point 6, for example when the vehicle 4 has entered the transfer point 6 via a gate 12.

There may be persons 14 or objects 16 situated at the transfer point 6. State information can be received, for example using a sensor 18 at the transfer point 6 and/or on the vehicle 4, wherein the state information is at least characteristic for the presence of the persons 14 or objects 16 at the transfer point. By way of example, at least one sensor sensitive to electromagnetic radiation can be used, particularly an optical sensor or a camera. By way of example, sensor values from the sensor 18 can be evaluated using image evaluation methods or image recognition methods. A sensor 18 may likewise be sensitive to thermal radiation or ultrasound and particularly comprise a motion sensor. The sensor 18 may further be configured for a distance measurement, for example using a Lidar sensor or a (TOF) camera.

Sensor values or state information can be transmitted by means of a communication device 20, for example, wherein the vehicle 4 and the transfer point 6 communicate via the communication device 20. The communication device 20 comprises a computer, server and/or a network, for example.

Further, a backend 22 is provided that is likewise connected to the communication device 20. Parts of the communication device 20, for example a server, may also be integrated in the backend 22.

Further apparatuses may be provided, for example a server and/or for example a part or a component of what is known as a Computer Cloud that dynamically provides data processing resources for the various users in a communication system. A Computer Cloud is particularly understood to mean a data processing infrastructure in accordance with the definition of the "National Institute for Standards and Technology" (NIST) for the term "cloud computing". An example of a computer cloud is a Microsoft Windows Azure platform.

Figure 2:
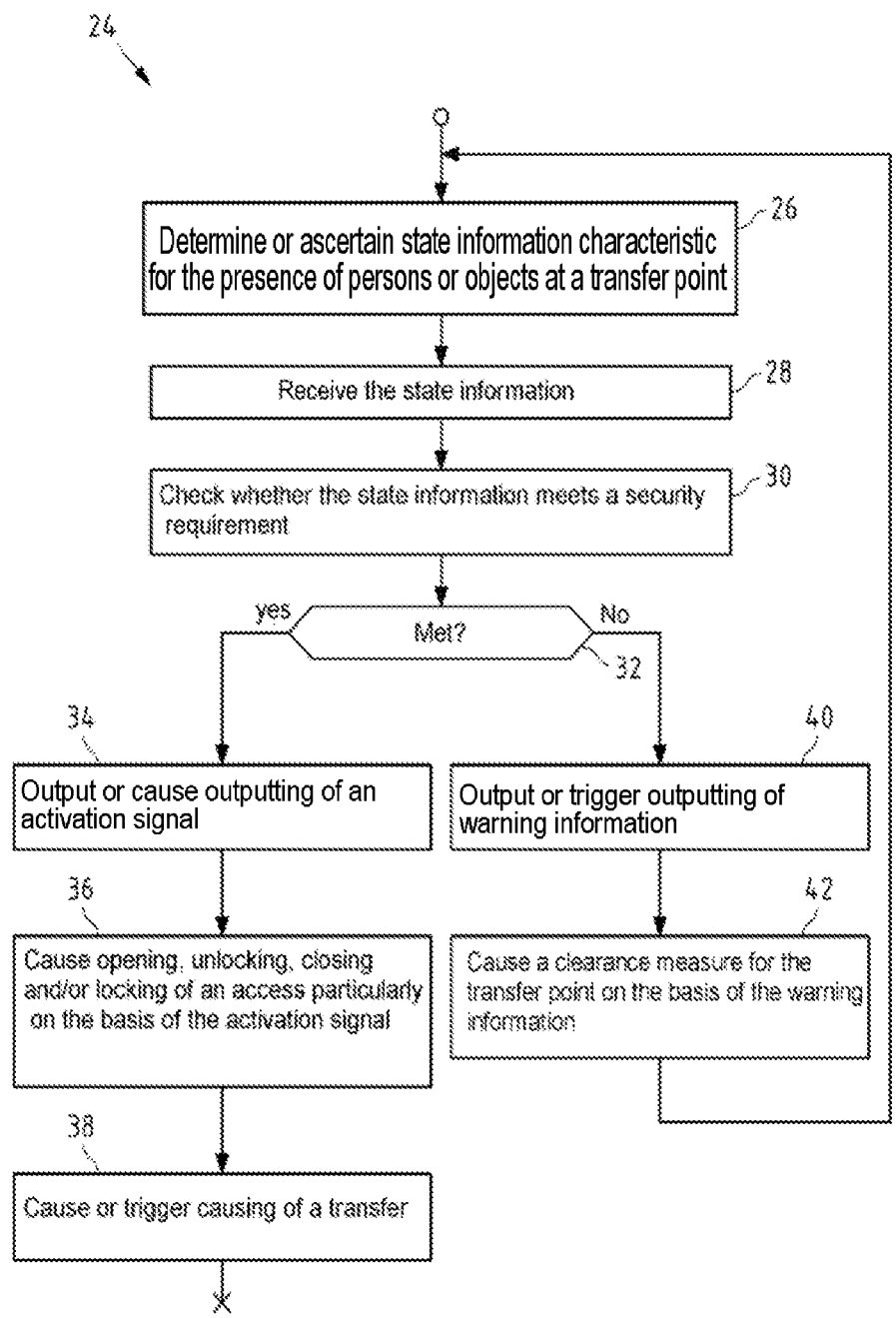
FIG. 2 shows a flowchart for an exemplary embodiment of a method in accordance with the first aspect of the present invention.

FIG. 2 shows a flowchart 24 for an exemplary embodiment of a method for providing security for a transfer point for at least one receiving apparatus, performed by one or more apparatuses, in accordance with the first aspect of the present invention.

Step 26 relates to determining or ascertaining state information characteristic for the presence of persons or objects at a transfer point. As already described, by way of example, visual information from the transfer point is provided or a distance measurement from surfaces at the transfer point is performed. By way of example, image recognition or classification can be used to establish whether there are persons or objects situated at the transfer point. The state information is, by way of example, further characteristic for the status of at least one transfer apparatus and/or the transfer point. By way of example, the state information is used to detect whether the at least one transfer apparatus and/or the transfer point are faulty or functional.

In step 28, the state information is received. By way of example, the state information is forwarded from a sensor device or an evaluation apparatus to a further apparatus, for example a server or a control unit, and received there.

In step 30, a check is performed to determine whether the state information meets a security requirement. The security requirement comprises, by way of example, a maximum or minimum number of persons and/or objects that can be situated at the transfer point. The security requirement can also take into consideration a further classification of the state information, for example that objects present at the transfer point are only to meant have a maximum size or that persons and/or objects are meant to be present only at some positions at the transfer point.

Step 32 is used to decide, in line with the result of the check from step 30, what further steps are performed.

Step 34 relates to outputting or causing outputting of an activation signal only if the state information meets the security requirement. By way of example, step 36 involves causing opening, unlocking, closing and/or locking of an access, particularly on the basis of the activation signal. As access to the transfer point, at least one door is provided as access for persons and/or at least one gate is provided as access for a transfer apparatus, for example. Similarly, at least one receiving apparatus at the transfer point may be provided with a door as access for receiving shipments and/or deliveries, the door to the receiving apparatus being influenced particularly by the activation signal.

Further, step 38 relates to causing a transfer of at least one shipment and/or delivery between the transfer apparatus and a receiving apparatus particularly on the basis of the activation signal. In particular, a shipment and/or delivery is removed from the transfer apparatus in automated fashion, for example by means of a robot arm, and taken to the receiving apparatus, or removed from the receiving apparatus and taken to the transfer apparatus. The method can be terminated with step 38, for example.

If the state information does not meet the security requirement according to step 32, outputting or triggering of outputting of warning information is performed in step 40, for example.

By way of example, step 42 involves causing a clearance measure for the transfer point on the basis of the warning information. A clearance measure is understood to mean particularly measures that cause or promote clearance at the transfer point directly or indirectly. By way of example, an audible or visual warning is output, or output thereof is caused. Further measures are, by way of example, raising of the noise level, changing of the temperature, changing of light conditions, for example darkening of the transfer point. Further, by way of example, a communication by an operator at the backend with the person/persons at the transfer point is initiated. Similarly, personnel such as employees, a maintenance service, a security service, an emergency service or the police can be notified on the basis of warning information. Subsequent to step 42, the method can begin again with step 26, for example.

Figure 3:
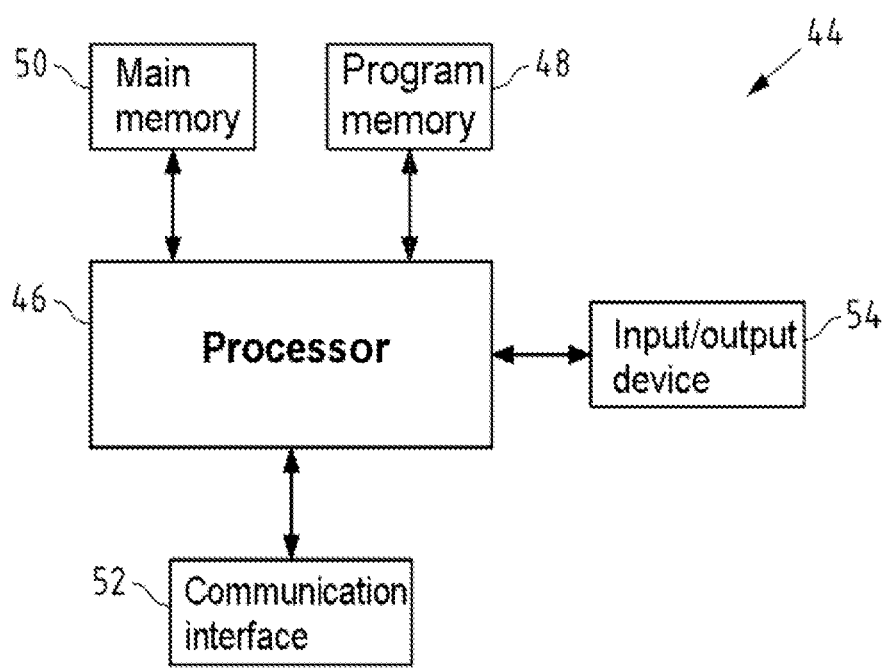
FIG. 3 shows a block diagram of an exemplary embodiment of an apparatus that can perform particularly an exemplary method in accordance with the first aspect of the present invention.

FIG. 3 shows a block diagram of an exemplary embodiment of an apparatus 44 that can perform particularly an exemplary method in accordance with the first aspect of the invention. A vehicle in accordance with the second aspect or a transfer point in accordance with the third aspect of the invention can comprise such an apparatus 44 as shown in FIG. 3 for example.

The apparatus 44 may in this respect be, by way of example, a computer, a desktop computer, a server, a Thin-client or a portable computer (mobile device), such as a laptop computer, a tablet computer, a personal digital assistant (PDA) or a smartphone, for example. The apparatus can perform the function of a server or a client, for example.

Processor 46 of the apparatus 44 is particularly in the form of a microprocessor, microcontrol unit, microcontroller, digital signal processor (DSP), application-specific integrated circuit (ASIC) or field programmable gate array (FPGA).

Processor 46 executes program instructions that are stored in program memory 48 and stores, by way of example, interim results or the like in main memory 50. For example, program memory 48 is a nonvolatile memory such as a flash memory, a magnetic memory, an EEPROM (electrically erasable programmable read-only memory) store and/or an optical memory. Main memory 50 is, for example, a volatile or nonvolatile memory, particularly a random access memory (RAM) such as a static RAM (SRAM) store, a dynamic RAM (DRAM) store, a ferroelectric RAM (Fe-RAM) store and/or a magnetic RAM (MRAM) store.

Program memory 48 is preferably a local data carrier permanently connected to the apparatus 44. Data carriers permanently connected to the apparatus 44 are, by way of example, hard disks that are installed in the apparatus 44. Alternatively, the data carrier may, by way of example, also be a data carrier detachably connectable to the apparatus 44, such as a memory stick, a removable data carrier, a portable hard disk, a CD, a DVD and/or a floppy disk.

Program memory 48 contains, by way of example, the operating system of the apparatus 44, which is at least partly loaded into main memory 50 when the apparatus 44 starts, and is executed by the processor 46. In particular, when apparatus 44 starts, at least part of the core of the operating system is loaded into the main memory 50 and executed by processor 46. The operating system of apparatus 44 is, by way of example, a Windows, UNIX, Linux, Android, Apple iOS and/or MAC operating system.

The operating system particularly allows the use of the apparatus 44 for data processing. It manages, by way of example, resources such as main memory 50 and program memory 48, communication interface 52, input and output device 54, makes basic functions available to other programs through programming interfaces, inter alia, and controls the execution of programs.

Processor 46 controls the communication interface 52, which, by way of example, may be a network interface and may be in the form of a network card, network module and/or modem. The communication interface 52 is particularly configured to set up a connection from the apparatus 44 to other apparatuses, particularly via a (wireless) communication system, for example a network, and to communicate with said other apparatuses. The communication interface 52 can, by way of example, receive data (via the communication system) and forward them to processor 46 and/or receive data from processor 46 and send them (via the communication system). Examples of a communication system are a local area network (LAN), a wide area network (WAN), a wireless network (for example based on the IEEE-802.11 standard, the Bluetooth (LE) standard and/or the NFC standard), a wired network, a mobile radio network, a telephone network and/or the Internet.

Furthermore, processor 46 can control at least one input/output device 54. Input/output device 54 is, by way of example, a keyboard, a mouse, a display unit, a microphone, a touch-sensitive display unit, a loudspeaker, a reader, a drive and/or a camera. Input/output device 54 can, by way of example, receive inputs from a user and forward them to processor 46 and/or receive and output information for the user from processor 46.

Further, storage media may be provided on which an exemplary embodiment of a computer program according to the invention may be stored. The storage medium may be, by way of example, a magnetic, electrical, optical and/or other kind of storage medium. The storage medium may be, by way of example, part of a processor (e.g. the processor 46 of FIG. 3), for example a (nonvolatile or volatile) program memory of the processor or a part thereof (such as program memory 48 in FIG. 3). Exemplary embodiments of a storage medium are a flash memory, an SSD hard disk, a magnetic hard disk, a memory card, a memory stick (e.g. a USB stick), a CD-ROM or DVD or a floppy disk.

Figure 4A:
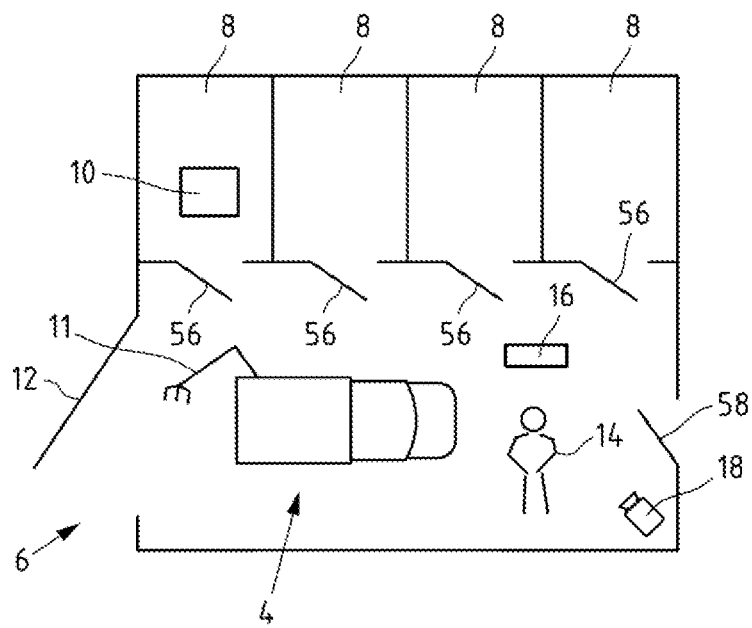
FIGS. 4a and 4b show schematic depictions of exemplary embodiments of vehicles and transfer points in accordance with the second and third aspects of the present invention.
Figure 4B:
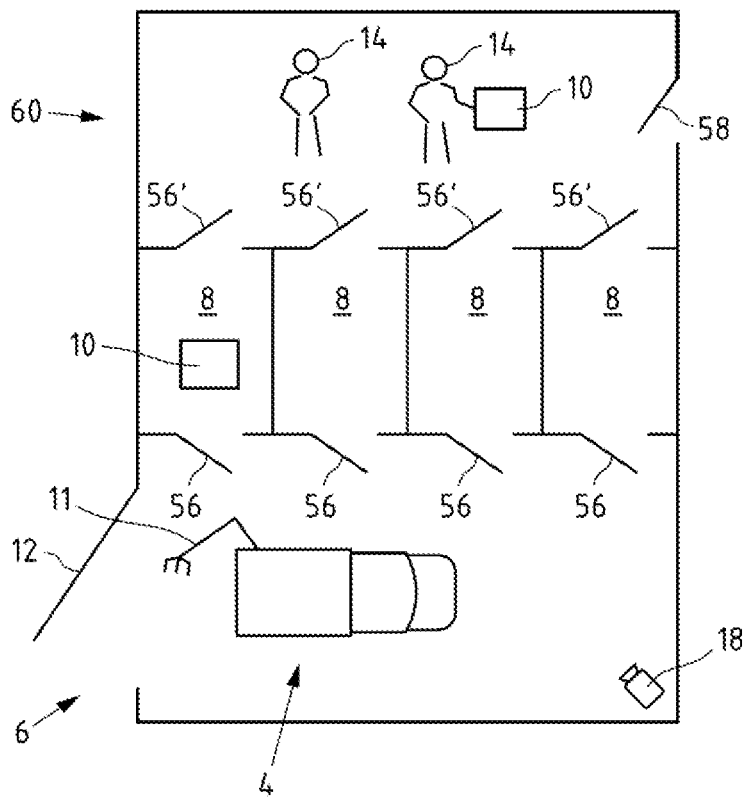

FIGS. 4a and 4b show schematic depictions of exemplary embodiments of vehicles 4 and transfer points 6 in accordance with the second and third aspects of the present invention. In FIGS. 4a and 4b and also FIG. 1, the same reference symbols are used for corresponding elements each time, even if the configurations of the elements of the individual embodiments may vary among one another.

FIG. 4a shows an exemplary embodiment of a transfer point 6 in accordance with the third aspect of the present invention, wherein the transfer point 6 is configured for multiple receiving apparatuses 8, such as e.g. a parcel station, a safety deposit box installation or goods delivery container, particularly parcel boxes. The receiving apparatuses 8 are configured for receiving and keeping shipments and/or deliveries 10 and have doors 56 via which the shipments and/or deliveries 10 can be introduced into or removed from the receiving apparatuses 8. The doors 56 can further be closed and locked, so that access can be prevented for unauthorized persons.

Access for persons 14 to the transfer point 6 in the form of a door 58 is provided. By way of example, the transfer point 6 from FIG. 4a is public and any persons 14 can enter in order to be at the transfer point 6 and to use the receiving apparatuses 8. Similarly, an access control apparatus may be provided, with only registered persons 14 gaining access via the door 58. Ultimately, however, the transfer point 6 is even then used by persons 14 in order to gain access to the receiving apparatuses 8.

The transfer point 6 is configured so that the vehicle 4 in accordance with the second aspect of the invention can enter the transfer point 6 via a gate 12, so that a transfer from the transfer point 6 is protected, for example against weather influences or unauthorized access. The transfer is performed, by way of example, by means of a robot arm 11 that can transfer shipments and/or deliveries 10 between the vehicle 4 and the receiving apparatuses 8.

A sensor 18 for determining or ascertaining state information characteristic for the presence of persons 14 or objects is provided.

FIG. 4b shows a further exemplary embodiment of a transfer point 6 in accordance with the third aspect of the present invention, wherein the transfer point 6 is nonpublic, in contrast to FIG. 4a.

Access to the receiving apparatuses 8 by the persons 14 is instead provided via an anteroom 60, which is separate from the transfer point 6 and which has access for persons 14 in the form of door 58. The receiving apparatuses 8 each have at least two doors 56, 56', one door 56' respectively being embodied for access by persons 14 from the anteroom 60.

Further doors 56 on the receiving apparatuses 8 are used for loading and removal of shipments and/or deliveries 10 within a transfer via the delivery company. Accordingly, the transfer point 6 is configured so that a vehicle 4 as a transfer apparatus can enter the transfer point 6, so that a transfer of shipments and/or deliveries 10 from and to the receiving apparatuses 8 can take place in a protected manner. A sensor 18 for determining or ascertaining state information characteristic for the presence of persons 14 or objects is provided at the transfer point 6.

The state information determined or ascertained by the sensors 18 of the embodiments from FIGS. 4a and 4b can be used in a method in accordance with the first aspect of the present invention. Similarly, the vehicles 4 can have sensors in order to provide state information.

The security requirements, activation signals, warning information and any clearance measures for the embodiments from FIGS. 4a and 4b may be embodied differently. Since the transfer point 6 from FIG. 4a is public, a certain maximum number of persons may be permissible, for example. Similarly, an activation signal can be taken as a basis for opening, unlocking, closing or locking the door 58 for persons 14 in order to allow persons 14 to leave the transfer point 6 or in order to secure the transfer point 6 against entry. In the case of the nonpublic transfer point 6, it is possible, by way of example, for the security requirement to predetermine that no persons 14 can be present and that warning information is used to notify a security service.

Figure 5:
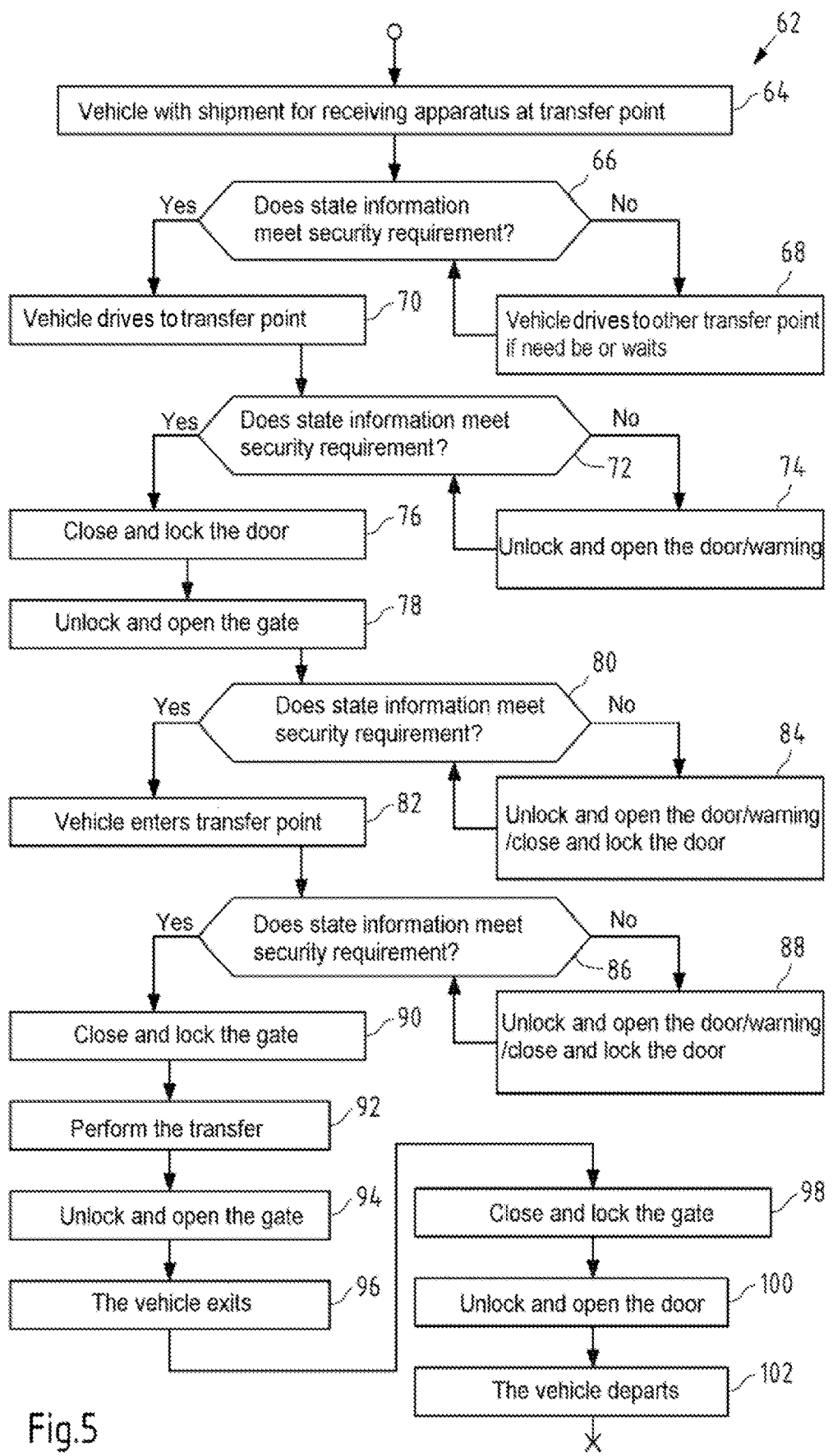
FIG. 5 shows a flowchart for a further exemplary embodiment of a method in accordance with the first aspect of the present invention.

FIG. 5 shows a flowchart 62 for a further exemplary embodiment of a method in accordance with the first aspect of the present invention. This exemplary embodiment is explained on the basis of a chronological sequence of steps. Several of the steps may also be performed simultaneously, however, or the chronological order of steps can be interchanged. Further, it is also possible for single steps to be omitted, repeated or added. The steps from FIG. 5 are based on interaction with a transfer point from FIG. 4a, for example.

In step 64, a vehicle having a shipment and/or delivery for a transfer point is provided. By way of example, a vehicle is loaded with a shipment and/or a delivery at a central distribution point for shipments and/or deliveries. Similarly, it is possible, by way of example, for a shipment and/or delivery to be ready for collection by the vehicle at a transfer point and for the vehicle to be assigned to collect this shipment and/or delivery.

Step 66 is depicted in FIG. 5 in shortened form as a check on the state information to determine whether the security requirement is met. However, step 66 comprises at least:

receiving state information at least characteristic for the presence of persons or objects at the transfer point;

checking whether the state information meets a security requirement; and outputting or causing outputting of an activation signal only if the state information meets the security requirement, and particularly further:

determining or ascertaining the state information characteristic for the presence of persons or objects at the transfer point.

By way of example, a sensor at the transfer point is used to pick up sensor values that can be used for determining or ascertaining the state information. A security requirement may be, by way of example, that no persons or objects are situated at the transfer point, so that blocking of a transfer, unauthorized access to a shipment and/or delivery during the transfer and/or a risk of injury is/are prevented.

If the security requirement is not met, then the vehicle can drive to a different transfer point in step 68, for example, in order to avoid unnecessary waiting times. Further, the vehicle can also, by way of example, initially remain and wait at the central distribution point until the state information from the transfer point meets the security requirement, this being caused by the vehicle or predetermined by a control center, for example.

If the security requirement is met, the vehicle drives to the transfer point in step 70.

When the vehicle is situated at the transfer point, a check on the state information is performed in step 72, step 72 being depicted in shortened form like step 66.

If the security requirement is not met, for example because there are persons at the transfer point, contrary to the security requirement, then a door for persons is unlocked and opened in step 74, for example. Clearance measures can be performed, for example a visual or audible warning is given to the persons present to leave the transfer point. In the meantime, the vehicle waits at the transfer point, for example, or drives to another transfer point. By way of example, after a predetermined time, a fresh check on the state information can be performed in step 72 in order to establish whether the persons have left the transfer point.

If the security requirement is met, the door can be locked and sealed in step 76, so that no further persons can enter the transfer point. In step 78, the gate can be unlocked and opened in order to allow the vehicle to enter in step 82.

Before step 82, however, a fresh check on the state information can be performed with step 80, for example in order to ensure that no persons have entered the transfer point during opening of the gate. In this case, step 82 is depicted in shortened form like step 66. Further, there may also be a sensor provided on the vehicle that can effect determination or ascertainment of the state information through the open gate.

If the security requirement is not met, clearance measures can be taken and, by way of example, the door can be unlocked and opened in step 84, in a similar manner to step 74. After clearance measures have been taken, the door can be closed again and locked, for example after a determined time has elapsed or after a fresh check on state information.

In step 82, the vehicle finally enters the transfer point. Optionally, a further check—depicted in shortened form—on the state information can take place in step 86 and if need be clearance measures can be performed in step 88.

In step 90, the gate is closed and locked in order to again prevent unauthorized entry of persons through the gate. With step 92, a transfer of shipments and/or deliveries between the vehicle and the receiving apparatuses finally takes place.

Further, after transfer has taken place in step 94, the gate can be unlocked and opened in order to allow the vehicle to exit in step 96. After the gate has been closed and locked in step 98, the door can be unlocked and opened in step 100 so that persons can enter the transfer point again. In step 102, the vehicle departs and the method is terminated.

Between the individual steps 94, 96, 98, 100 and 102, it is further possible for checks on the state information to take place in a similar manner to step 66, this not being depicted in FIG. 5. By way of example, this can ensure that the opening or closing of the gate and of the door and the exit of the vehicle are not blocked.

The exemplary embodiments of the present invention that are described in this specification, and the respectively cited optional features and properties in this regard, are also intended to be understood as disclosed in all combinations with one another. In particular, the description of a feature that an exemplary embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable. The method steps can be implemented in different ways, and implementation in software (by virtue of program instructions), hardware or a combination of the two is conceivable for implementing the method steps.

All references, including publications, patent applications, and patents cited herein are hereby incorporated by reference to the same extent as if each reference were individually and specifically indicated to be incorporated by reference and were set forth in its entirety herein.

Terms used in the patent claims such as "comprise", "have", "contain", "include" and the like do not exclude further elements or steps. The wording "at least partly" covers both the "partly" case and the "completely" case. The wording "and/or" is intended to be understood to mean that both the alternative and the combination are intended to be disclosed, that is to say that "A and/or B" means "(A) or (B) or (A and B)". The use of the indefinite article does not exclude a plurality. A single apparatus can perform the functions of multiple units or apparatuses cited in the patent claims. Reference symbols specified in the patent claims are not intended to be regarded as restrictions for the means and steps employed.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus comprising at least one processor and at least one memory that contains program code, wherein the memory and the program code are configured to cause, with the at least one processor, an apparatus to perform and/or control at least:
   receiving state information at least indicative of the presence of at least one person and/or at least one object at a transfer point for at least one receiving apparatus, wherein the transfer point comprises a room in which the at least one receiving apparatus is provided;
   wherein the transfer point is configured to grant at least one vehicle access to the at least one receiving apparatus so that the vehicle can perform a transfer;
   wherein the vehicle is a driving-land vehicle, aircraft and/or water craft; and
   wherein a performance of a determining or ascertaining of the state information is triggered by a detection of a status of the vehicle or the triggering of the performance of the determining or ascertaining of the state information is caused by the detection of the status of the vehicle, wherein the determining or ascertaining of the state information is performed by the vehicle;
   checking whether the state information meets a security requirement, wherein the security requirement relates to the presence of a determined number of persons and/or objects at the transfer point; and
   outputting or causing outputting of an activation signal only if the state information meets the security requirement.

2. Apparatus according to claim 1, wherein the determining or ascertaining of the state information comprises the use of at least one sensor sensitive to electromagnetic radiation or to ultrasound, particularly at least one optical and/or thermal-radiation-sensitive sensor.

3. Apparatus according to claim 1, wherein the state information is further indicative of the status of at least one access to the transfer point and/or the activation signal is causal for a change of status of at least one access to the transfer point.

4. Apparatus according to claim 3, wherein the transfer point has at least one gate as access for the vehicle, and wherein the memory and the program code are further configured to cause, with the at least one processor, the apparatus to perform and/or control:
   causing opening and/or unlocking of the gate; or
   causing closing and/or locking of the gate; particularly on the basis of the activation signal, wherein the activation signal is causal for a change of status of the gate.

5. Apparatus according to claim 3, wherein the transfer point has at least one door as access for persons, and wherein the memory and the program code are further configured to cause, with the at least one processor, the apparatus to perform and/or control:
   causing opening and/or unlocking of the door; or
   causing closing and/or locking of the door; particularly on the basis of the activation signal, wherein the activation signal is causal for a change of status of the door.

6. Apparatus according to claim 1, wherein the memory and the program code are further configured to cause, with the at least one processor, the apparatus to perform and/or control:
outputting or triggering outputting of warning information if the state information does not meet the security requirement.

7. Apparatus according to claim 6, wherein the memory and the program code are further configured to cause, with the at least one processor, the apparatus to perform and/or control:
causing a clearance measure for the transfer point on the basis of the warning information.

8. Apparatus according to claim 1, wherein the memory and the program code are further configured to cause, with the at least one processor, the apparatus to perform and/or control:
receiving the activation signal and/or warning information by the vehicle; and
causing a change of a mode of operation of the vehicle on the basis of the activation signal and/or warning information.

9. Apparatus according to claim 8, wherein the mode of operation of the vehicle comprises performance of at least one transfer, movement of the vehicle, waiting of the vehicle or a combination thereof.

10. Apparatus according to claim 1, wherein the state information is further indicative of the status of the vehicle.

11. Vehicle for use as a transfer apparatus for at least one transfer point,
wherein the vehicle is configured to communicate with an apparatus according to claim 1 and/or comprises an apparatus comprising at least one processor and at least one memory that contains program code, wherein the memory and the program code are configured to cause, with the at least one processor, an apparatus to perform and/or control at least:
receiving state information at least indicative of the presence of at least one person and/or at least one object at a transfer point for at least one receiving apparatus, wherein the transfer point comprises a room in which the at least one receiving apparatus is provided; wherein the transfer point is configured to grant the vehicle access to the at least one receiving apparatus so that the vehicle can perform a transfer; and
wherein a performance of a determining or ascertaining of the state information is triggered by a detection of a status of the vehicle or the triggering of the performance of the determining or ascertaining of the state information is caused by the detection of the status of the vehicle;
checking whether the state information meets a security requirement, wherein the security requirement relates to the presence of a determined number of persons and/or objects at the transfer point; and
outputting or causing outputting of an activation signal only if the state information meets the security requirement, and
wherein the vehicle is configured to access the at least one receiving apparatus of the at least one transfer point so that the vehicle can perform a transfer.

12. Transfer point for at least one receiving apparatus, wherein the transfer point comprises a room in which the at least one receiving apparatus is provided; wherein the transfer point is configured to grant at least one vehicle access to the at least one receiving apparatus so that the vehicle can perform a transfer;
wherein the transfer point is configured to communicate with an apparatus according to claim 1 and/or comprises this apparatus; and/or
wherein the transfer point is configured to communicate with the vehicle, the vehicle being configured to communicate with an apparatus according to claim 1 and/or comprises an apparatus comprising at least one processor and at least one memory that contains program code, wherein the memory and the program code are configured to cause, with the at least one processor, an apparatus to perform and/or control at least:
receiving state information at least indicative of the presence of at least one person and/or at least one object at a transfer point for at least one receiving apparatus, wherein the transfer point comprises a room in which the at least one receiving apparatus is provided; wherein the transfer point is configured to grant the vehicle access to the at least one receiving apparatus so that the vehicle can perform a transfer; and
wherein a performance of a determining or ascertaining of the state information is triggered by a detection of a status of the vehicle or the triggering of the performance of the determining or ascertaining of the state information is caused by the detection of the status of the vehicle;
checking whether the state information meets a security requirement, wherein the security requirement relates to the presence of a determined number of persons and/or objects at the transfer point; and
outputting or causing outputting of an activation signal only if the state information meets the security requirement.

13. System, comprising one or more apparatuses according to claim 1.

14. The apparatus according to claim 1, wherein the state information meets the security requirement only if the state information is indicative for the presence of no persons at the transfer point.

15. The apparatus according to claim 1, wherein the apparatus is permanently installed in the vehicle.

16. The apparatus according to claim 1, wherein the vehicle is an automobile.

17. Method for providing security for a transfer point for at least one receiving apparatus, the transfer point comprising a room in which the at least one receiving apparatus is provided, the transfer point being configured to grant a vehicle access to the at least one receiving apparatus so that the vehicle can perform a transfer, the method performed by one or more apparatuses and comprising:
receiving state information at least indicative of the presence of at least one person and/or at least one object at the transfer point;
checking whether the state information meets a security requirement, wherein the security requirement relates to the presence of a determined number of persons and/or objects at the transfer point;
outputting or causing outputting of an activation signal only if the state information meets the security requirement;
wherein a performance of a determining or ascertaining of the state information is triggered by the detection of a status of the vehicle or the triggering of the performance of the determining or ascertaining of the state information is caused by detection of the status of the vehicle;

wherein the vehicle is a driving-land vehicle, aircraft and/or water craft; and wherein the determining or ascertaining of the state information is performed by the vehicle.

18. Method according to claim 17, wherein the state information is further indicative of the status of at least one access to the transfer point and/or the activation signal is causal for a change of status of at least one access to the transfer point, and wherein either (i) or (ii) holds:
   (i) the transfer point has at least one gate as access for the vehicle, and the method further comprises causing opening and/or unlocking of the gate; or causing closing and/or locking of the gate; wherein the activation signal is causal for a change of status of the gate;
   (ii) the transfer point has at least one door as access for persons, and the method further comprises causing opening and/or unlocking of the door; or causing closing and/or locking of the door; wherein the activation signal is causal for a change of status of the door.

19. A non-transitory computer-readable storage medium containing a computer program comprising program instructions causing a processor to perform and/or control, when the computer program runs on the processor, at least following:

receiving state information at least indicative of the presence of at least one person and/or at least one object at a transfer point for at least one receiving apparatus,
wherein the transfer point comprises a room in which the at least one receiving apparatus is provided;
wherein the transfer point is configured to grant a vehicle access to the at least one receiving apparatus so that the vehicle can perform a transfer;
wherein the vehicle is a driving-land vehicle, aircraft and/or water craft; and
wherein a performance of a determining or ascertaining of the state information is triggered by a detection of a status of the vehicle or the triggering of the performance of the determining or ascertaining of the state information is caused by the detection of the status of the vehicle and wherein the determining or ascertaining of the state information is performed by the vehicle;
checking whether the state information meets a security requirement, wherein the security requirement relates to the presence of a determined number of persons and/or objects at the transfer point; and
outputting or causing outputting of an activation signal only if the state information meets the security requirement.

* * * * *